No. 827,757. PATENTED AUG. 7, 1906.
W. SHAKESPEARE, Jr.
FISH HOOK.
APPLICATION FILED OCT. 23, 1905.

Witnesses:
Ethel A. Bradford
Amelia J. Alber

Inventor,
William Shakespeare Jr.
By Chappell Earl
Att'ys

UNITED STATES PATENT OFFICE.

WILLIAM SHAKESPEARE, JR., OF KALAMAZOO, MICHIGAN.

FISH-HOOK.

No. 827,757. Specification of Letters Patent. Patented Aug. 7, 1906.

Application filed October 23, 1905. Serial No. 284,016.

*To all whom it may concern:*

Be it known that I, WILLIAM SHAKESPEARE, Jr., a citizen of the United States, residing at the city of Kalamazoo, county of Kalamazoo, State of Michigan, have invented certain new and useful Improvements in Fish-Hooks, of which the following is a specification.

This invention relates to improvements in fish-hooks.

The main object of this invention is to provide an improved fish-hook which is capable of withstanding very severe strains and at the same time is comparatively light in weight and attractive in appearance.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1:
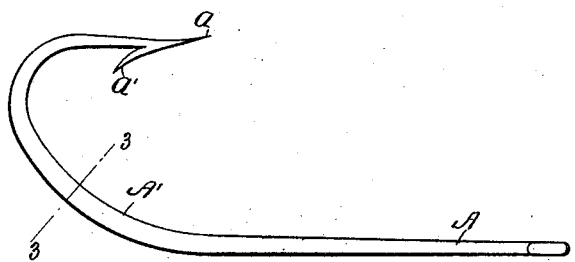
Figure 2:
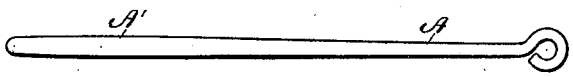
Figure 3:

Figure 1 is a side elevation of my improved fish-hook. Fig. 2 is a rear elevation thereof. Fig. 3 is a cross-section taken on a line corresponding to line 3 3 of Figs. 1 and 2.

In the drawings similar letters of reference refer to similar parts throughout the several views.

Referring to the drawings, the shank A of my improved fish-hook is preferably of uniform diameter to approximately the beginning of the curve of the hook. The curved portion A' of the hook is enlarged or thickened. The thickened portion is substantially round in cross-section and is gradually tapered to the shank portion and to the point *a* of the hook. The hook is provided with a barb *a'* of the usual or any desired form. By thus strengthening the hook the same is made capable of withstanding very severe strains. The curved portion of the hook is the point where the greatest strain occurs in the event of a pull upon the point, such as is caused by snagging when in use and the like. A very small hook when thus formed is capable of sustaining a heavy load and the liability of its point becoming twisted or bent out of position is very remote.

The point of the hook may be made very sharp and fine, and the shank portion may also be very light and the hook still be very strong. These features also give the hook a very attractive and graceful appearance.

I prefer that the enlarged curved portion A' be round in cross-section, as, thus constructed, it is capable of withstanding strains and twists from all directions. However, this might be modified and valuable results still be secured.

My improved fish-hook is, as stated, attractive in appearance and economical to produce.

Having thus described my invention, what I claim as new, and desire to secure by Letters Patent, is—

1. A fish-hook having a shank portion of substantially uniform diameter to approximately the beginning of the curve of the hook, and an enlarged or thickened curved portion, said thickened curved portion being substantially round in cross-section and gradually tapered to the shank portion and to the point of the hook.

2. A fish-hook having a shank portion of substantially uniform diameter to approximately the beginning of the curve of the hook, and an enlarged or thickened curved portion, said thickened curved portion being substantially round in cross-section.

3. A fish-hook having an enlarged or thickened curved portion, said thickened curved portion being substantially round in cross-section and gradually tapered to the shank portion and to the point of the hook.

4. A fish-hook having an enlarged or thickened curved portion, said thickened curved portion being substantially round in cross-section.

5. A fish-hook having a shank portion of substantially uniform diameter to approximately the beginning of the curve of the hook, and an enlarged or thickened curved portion, said thickened curved portion being gradually tapered to the shank portion and to the point of the hook.

6. A fish-hook having an enlarged or thickened curved portion, said thickened curved portion being gradually tapered to the shank portion and to the point of the hook.

7. A fish-hook having an enlarged or thickened curved portion.

In witness whereof I have hereunto set my hand and seal in the presence of two witnesses.

WILLIAM SHAKESPEARE, JR. [L. S.]

Witnesses:
ETHEL A. BRADFORD,
OTIS A. EARL.